United States Patent [19]

Brazelton

[11] 3,859,607

[45] Jan. 7, 1975

[54] SWEEP GENERATOR WITH CRYSTAL CONTROLLED CENTER FREQUENCY

[75] Inventor: Bruce H. Brazelton, Laguna Niguel, Calif.

[73] Assignee: Telonic Industries, Inc., Laguna Beach, Calif.

[22] Filed: June 4, 1973

[21] Appl. No.: 366,759

[52] U.S. Cl. ............. 331/178, 324/57 SS, 328/141, 328/189, 331/18

[51] Int. Cl. ......................... H03b 23/00, H03k 3/00

[58] Field of Search ...... 331/178, 18; 328/189, 141; 324/57 R, 57 SS

[56] References Cited

UNITED STATES PATENTS

| | | | |
|---|---|---|---|
| 3,221,266 | 11/1965 | Vitkovits, Jr. | 331/178 X |
| 3,413,565 | 11/1968 | Babany et al. | 331/18 |
| 3,427,536 | 2/1969 | Wainwright | 328/189 X |
| 3,601,707 | 8/1971 | Bauer | 328/141 |

*Primary Examiner*—Siegfried H. Grimm
*Attorney, Agent, or Firm*—Knobbe, Martens, Olson, Hubbard & Bear

[57] ABSTRACT

An electronic sweep generator, particularly adapted to the calibration and measurement of television tuners, in which the sweep center frequency is automatically controlled and frequency markers are generated using a crystal oscillator, a frequency synthesizer and a harmonic generator; a harmonic selection circuit being used to blank all but the desired harmonic.

23 Claims, 15 Drawing Figures

SWEEP GENERATOR WITH CRYSTAL CONTROLLED CENTER FREQUENCY

BACKGROUND OF THE INVENTION

1. Field of the Invention

This invention relates to improvements in cyclic frequency sweeping apparatus, commonly known in the art as sweep generators, and more particularly to sweep generators having an automatically controlled center frequency or a marker pulse generator.

2. Description of the Prior Art

Heretofore, most sweep generators which have been used for displaying the frequency passband of a device under test have utilized two basic modes of operation. In one technique, the sweep generator is adjusted to repetitively sweep from a frequency $f_1$ to a frequency $f_2$ where $f_1$ is made lower than the lowest frequency of interest $f_2$ is made higher than the highest frequency of interest. Although a waveform corresponding to the passband of the device under test will be observed and measured throughout its tuning range, this technique has the serious disadvantage that the oscilloscope display of the device has a very narrow width if the tuning frequency of the device under test has any appreciable range.

Another procedure commonly used is to adjust the sweep width of the sweep generator so that the display covers only those frequencies of interest for a particular setting of the center frequency $f_0$ of the device under test. Then, each time the tuning frequency $f_0$ of the device under test is changed, the operator also manually adjusts the center frequency $f_c$ of the sweep generator to maintain the display centered on the face of the oscilloscope. On assembly lines where each tuned amplifier, bandpass filter, or the like is tested over its tuning range by a sweep generator, an appreciable amount of time and a considerable part of the attention of the operator are required to manually tune the sweep generator. This difficulty is aggravated when the ratio of the tuning range of the device under test is high in relation to the desired bandwidth to be observed.

A more advanced prior art technique is disclosed in Pat. No. 3,427,535, issued to Neil R. Welsh on Feb. 11, 1969, and assigned to the assignee of the present invention. That patent discloses two basic operating modes.

In the "waveform track" mode, the system automatically adjusts the center frequency $f_c$ in accordance with changes in the tuning frequency $f_0$ of the device under test so as to maintain the display of its passband centered on the oscilloscope display. This is accomplished by means responsive to the demodulated output waveform of the device under test which compares the wavefront of this waveform with its wave tail and generates a feedback control signal which automatically varies the center frequency of the sweep frequency generator so as to maintain a predetermined relationship between the wavefront and the wave tail. If no demodulated waveform is present, or if the demodulated waveform is of insufficient amplitude, no waveform is displayed on the oscilloscope and the sweep generator is automatically caused to cycle upward in frequency to search for and capture the passband of the device under test. When no demodulated waveform is detected and the sweep generator reaches its highest output frequency, means automatically return the sweep generator to its lowest frequency and the search cycle is repeated.

In this waveform-track mode of that invention, the wavefront and wave tail of the demodulated waveform are compared by detecting the times at which they intersect with a predetermined threshold voltage level. A first time interval is then measured between the initiation of the trace interval and the point of intersection of the wavefront with the threshold voltage and a second time interval measured between the intersection of the wave tail and the threshold level and the end of the trace interval. Opposite polarity current sources are selectively connected to an integrating capacitor during these time intervals so that the net charge delivered to the capacitor is proportional to the difference between these respective time intervals. The voltage across the capacitor, corresponding to the integrated current value, is used to provide the feedback control voltage to maintain the center frequency $f_c$ substantially equal to the center frequency $f_0$ of the device under test.

In the "marker track" mode, a first time interval is measured between the initiation of the trace interval and the marker pulse and a second time interval measured between the marker pulse and the end of the trace interval. The opposite polarity current sources are selectively connected to the integrating capacitor during these time intervals to deliver a net current to the capacitor proportional to the difference between these respective time intervals. The feedback control voltage, derived from the voltage across the integration capacitor, increases or decreases the center frequency $f_c$ so as to locate the marker pulse at the center of the track interval.

SUMMARY OF THE INVENTION

The present invention permits the automatic adjustment of the sweepp generator center frequency $f_c$ in response to a marker signal generated by a crystal oscillator and a frequency synthesizer. This arrangement permits the sweep generator to be adjusted so that the display covers only the frequencies of interest, but allows a plurality of extremely accurate center frequencies to be so presented. This is particularly advantageous in the testing of UHF television receivers, where the tuner must accurately select one of 69 channels, all of which fall within one octave of the radio frequency spectrum. Since the channel spacing is extremely close, common inductor-capacitor tuned circuits can be used to control the center frequency only with great difficulty, and with attention to constant realignment of the test instrument. While this difficulty suggests the use of crystal controlled oscillators for each of the 69 channels to be tested, and the control of the sweep generator center frequency directly in response to these crystal oscillators, it is economically unfeasible to produce test equipment with this large number of crystal controlled oscillators.

The frequency synthesizer permits the generation of a plurality of signals, each of a different frequency, but each derived through digital techniques from a single crystal controlled oscillator source so that each frequency so produced will exhibit the stability and the accuracy of a crystal controlled oscillator.

Since it is not feasible to operate the digital circuitry within the frequency synthesizer at the high frequencies required by the UHF television band, it is desirable to produce harmonics from the frequency synthesizer output and to then select desired harmonics for use in centering the sweep generator and for producing a marker pulse. The present invention provides for the selection of one such harmonic and the elimination of the remaining harmonics so that the sweep generator will respond only to the harmonic at the desired frequency. This is accomplished in the present invention through a circuit which generates a DC voltage level which is proportional to the frequency of the desired harmonic. This DC level is then compared with the ramp voltage produced in the sweep generator, which ramp voltage controls the output frequency of the sweep generator. A comparator is used to drive a gate which is opened and closed to permit only the harmonic of interest to pass to the control circuitry, thereby assuring operation of the sweep generator in response to this harmonic.

An additional feature of the present invention is the subsequent heterodyning of the harmonic of interest with a second crystal oscillator signal in order to produce a signal at the arithmetic channel center, that is, at the frequency midway between the audio and video carriers in the UHF channel, for the control of the sweep generator and the production of marker signals.

An additional feature of the present invention is the production of a pair of marker pulses from the crystal-controlled, synthesizer-produced harmonic signal, which marker pulses display the proper location of the audio and video carriers of the UHF channel.

The present invention therefore makes it possible to align or measure a UHF or other high frequency tuning apparatus or filter with crystal accuracy but without the extreme cost which would normally be involved in the measurement of a large plurality of channels within the ultrahigh frequency range.

These and other advantages of the present invention are best understood in reference to the drawings, in which.

Figure 2:
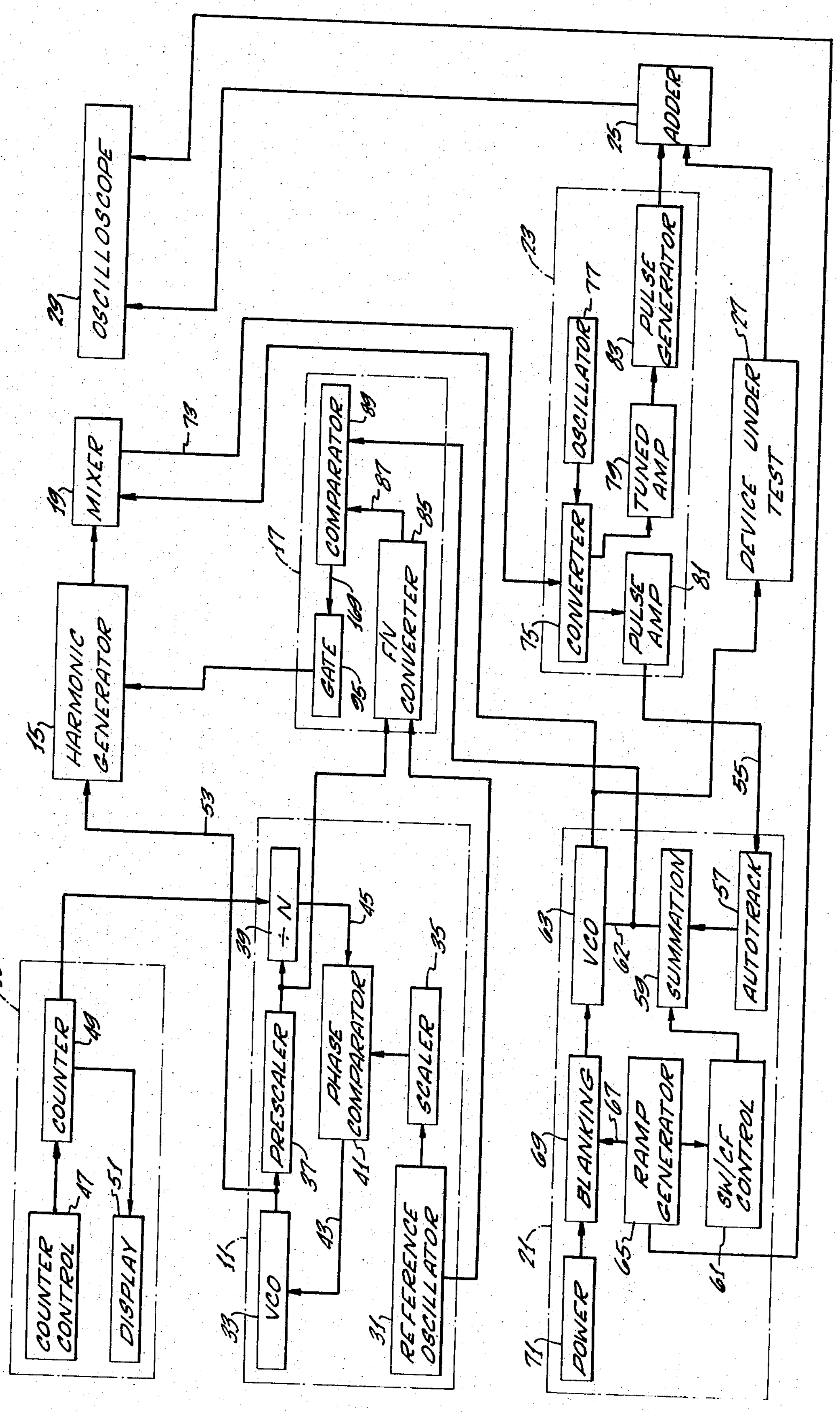
FIG. 2 is a more detailed block diagram showing the major subelements of each of the functional elements of FIG. 1 and the interrelationship of these subelements.

FIGS. *3a* through *3g* are charts of various waveforms of the circuit of FIG. 2.

Figure 1:
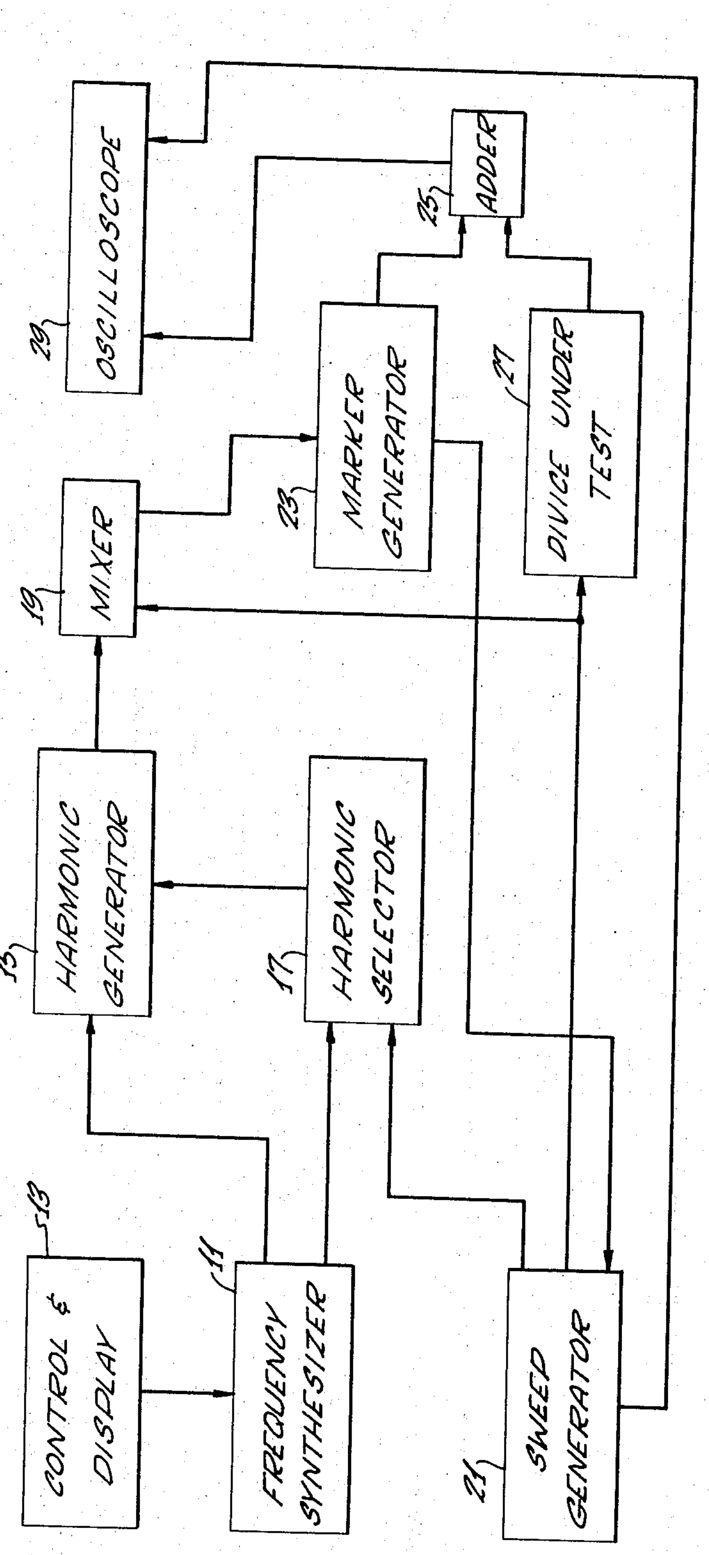
FIG. 1 is a schematic block diagram showing the primary functional elements of the present invention and their functional interrelationship.
Figure 4:
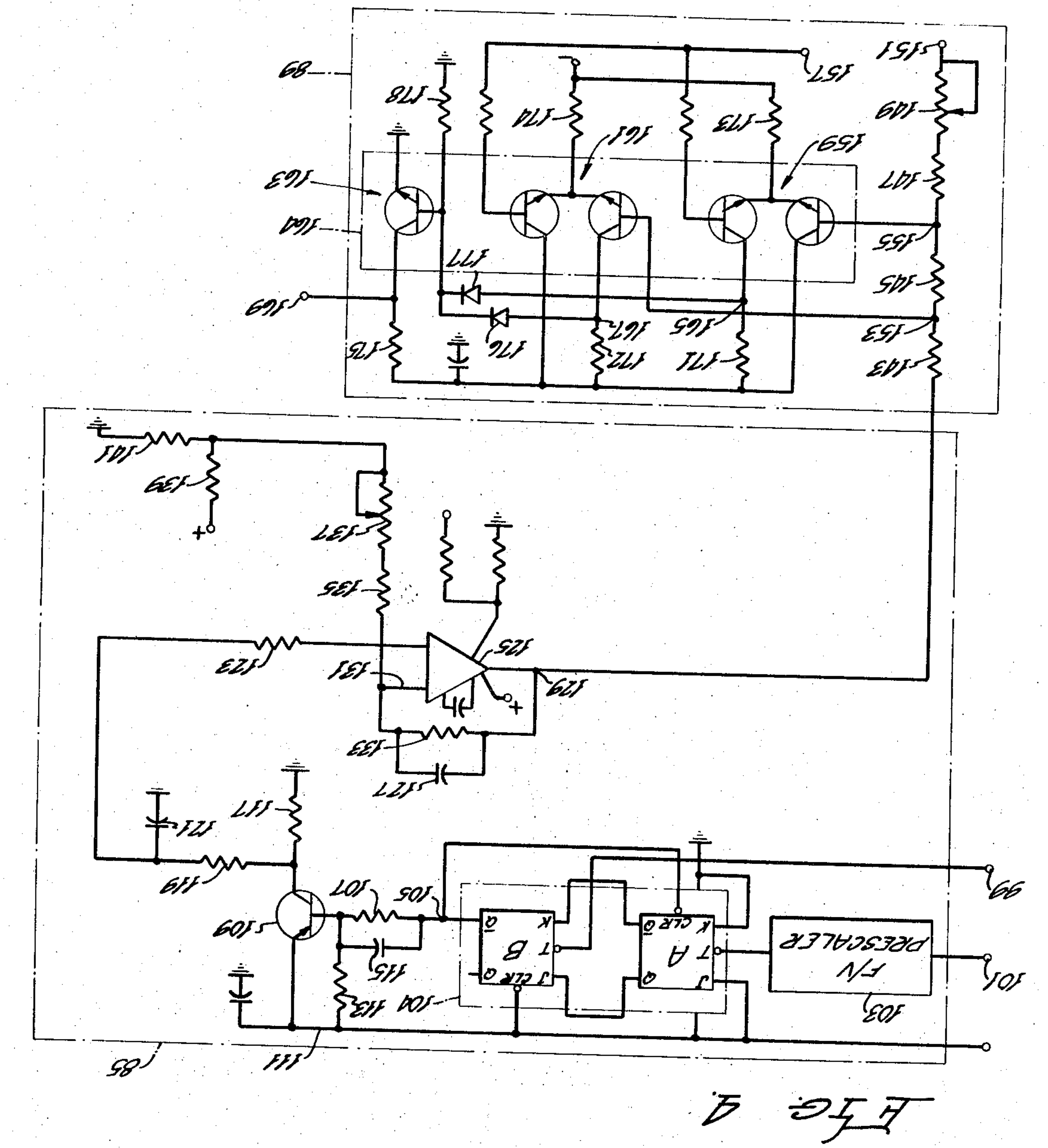
Figure 5A:
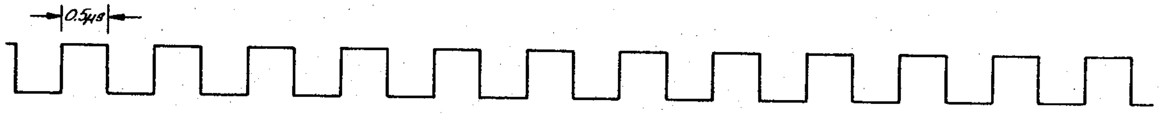
Figure 5B:
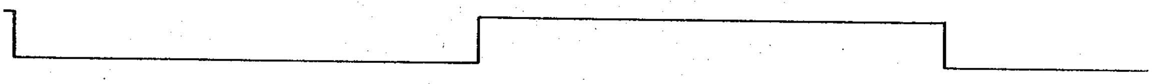
Figure 5C:
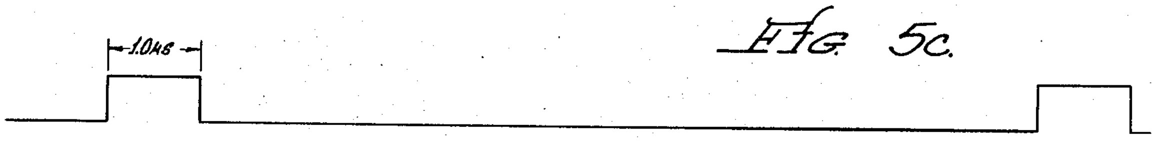
Figure 5D:
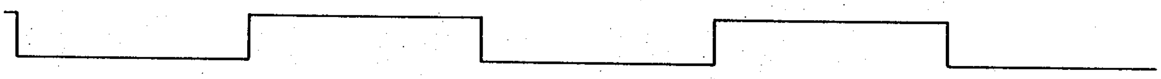
Figure 5E:
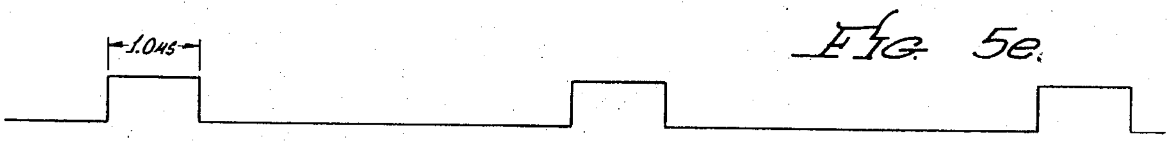

FIG. 4 is a schematic diagram of the frequency/voltage converter and comparator of the harmonic selector of FIGS. 1 and 2; and FIGS. *5a* through *5e* are charts of various waveforms of the circuit of FIG. 4.

DETAILED DESCRIPTION OF THE PREFERRED EMBODIMENT

Overall Description of the Sweep Generator and Marker System

Referring initially to FIG. 1, a frequency synthesizer 11 is utilized to digitally generate a desired fundamental frequency, a selected harmonic of which will be used for generating the marker pulse and the center frequency for the sweep generator. The frequency synthesizer 11 generates this fundamental frequency in reference to a crystal oscillator which is included within the frequency synthesizer 11 so that the resulting output is crystal controlled. A control and display element 13 is used to control the output frequency of the frequency synthesizer 11 and to display this frequency on a display panel. The fundamental frequency output of the frequency synthesizer 11 is coupled to a harmonic generator 15 which has the capability of producing a plurality of harmonics of the fundamental frequency. A harmonic selector 17 is responsive to the crystal oscillator of the frequency synthesizer 11 and operates to limit the harmonic generator 15 so that only a desired harmonic of the fundamental frequency from the frequency synthesizer 11 is coupled to a mixer 19.

The mixer 19 combines the signals from the harmonic generator 15 and the sweep generator 21 to produce a heterodyne signal. This heterodyne signal provides a frequency null when the output frequency of the sweep generator 21 and the output signal of the harmonic generator 15 are identical. This signal is coupled to a marker generator 23 which produces a pair of marker signals to mark the audio and video carriers of the UHF television channel, which signals are coupled to an adder 25. In addition, the marker generator 23 produces a signal which represents the center of the UHF television channel. This signal is coupled to control the center frequency $f_c$ of the sweep generator 21 to assure that the sweep generator 21 shows only those frequencies closely associated with the desired UHF television channel. The output of the sweep generator 21 is coupled to the device under test 27 and the output waveform of the device under test 27, that is, the frequency response of the device under test 27 in the range of the sweep generator 21, is coupled to the adder 25. The ouput of the adder 25 is then used to drive the vertical input of an oscilloscope 29. In addition, the sweep generator 21 produces a ramp signal for directly driving the horizontal input of the oscilloscope 29.

As will be noted from FIG. 1, the frequency synthesizer 11, through the harmonic generator 15, mixer 19 and marker generator 23, controls both the center frequency of the sweep generator 21 and the marker output to the adder 25. Thus, both the frequencies through which the sweep generator 21 operates and the audio and video carrier markers are referenced to the crystal oscillator and therefore avoid the drift problems normally associated with marker signal production. Since, therefore, the entire system is controlled in response to the crystal oscillator of the frequency synthesizer 11, the system eliminates the normal frequency drift which is typically associated with temperature changes and changes within circuit elements with time, so that the operator need not spend a substantial portion of his time realigning the test equipment.

Referring now to FIG. 2, the operation of the major subelements of the system shown in FIG. 1 will be explained. The frequency synthesizer 11 includes a reference oscillator 31, which is a crystal controlled oscillator and is used as the basic frequency reference for the entire system. The frequency synthesizer 11 additionally includes a voltage controlled oscillator 33, the output frequency of which is compared with the frequency of the reference oscillator 31 in order to permit operation of the oscillator 33 with crystal controlled accuracy. This frequency comparison is accomplished by scaling the reference oscillator 31 output in a scaler 35 to reduce the output frequency to a desired lower frequency. In addition, the output of the voltage controlled oscillator is first scaled in a prescaler 37 and then scaled in a variable divider network 39, designated "divide-by-N," where the integer N is selected to determine the desired output frequency of the voltage controlled oscillator 33. The output of the divide-by-N scaling circuit 39 and the scaler 35 are then compared in a phase comparator 41 which produces an output signal on a line 43 to control the frequency of the voltage controlled oscillator 33. By way of example, if the reference oscillator 31 operates at 1 MHz and the scaler 35 and prescaler 37 each scale the signals which they receive by a factor of 32, the phase comparator will receive a crystal controlled signal from the scaler 35 at 31.25 KHz. The phase comparator 41 will produce an output signal on the line 43 to the voltage controlled oscillator 33 as required to drive the voltage controlled oscillator 33 at frequency which will produce a signal on a line 45 from the divide-by-N scaler 39 which is equal to this signal, that is, 31.25 KHz. The divide-by-N scaler 39 may be adjusted by the operator to any integer between 76 and 145 for typical UHF television application. The total scaling of the output of the voltage control oscillator 33 in both the prescaler 37 and the divide-by-N scaler 39 is therefore variable between a factor of 2,432 and 4,480. If, for example, the output of the divide-by-N scaler 39 is reduced in frequency by a factor of 2,432, the phase comparator receives a signal, as stated earlier, of 31.25 kilocyles and will generate a signal on line 43 necessary to produce a 31.25 kilocycle signal on line 45. In order for this to occur, the output frequency from the voltage controlled oscillator 33 must be 31.25 times 2,432, or 76 MHz. It can therefore be seen that, since the prescaler 37 and the scaler 35 each scale their respective input signals by the same factor, and since the reference oscillator 31 operates at 1 MHz, the voltage controlled oscillator 33 will operate at a frequency which is equal to N times 1 MHz where N is the scaling factor of the scaler 39. Therefore, by operating the divide-by-N scaler 39 to scale by a factor of 76 to 145, the operator can control the output frequency of the voltage controlled oscillator 33 to operate at 69 different frequencies between 76 and 145 MHz, each such selected frequency being 1 MHz apart.

Such frequency synthesizing techniques using a phase comparator 41 to produce an output signal for driving a voltage controlled oscillator 33 to crystal accuracy are well known techniques and, as such, will be readily understood by those skilled in the art.

The control and display unit 13, as shown in FIG. 2, includes a counter control 47 which may be in turn controlled directly by the operator or may be connected to a computer or tape drive to automatically control the sequence of system operation. This counter control 47 is connected to a counter 49 which stores a digital count which is directly connected to the divide-by-N scaler 39 to control the scaling factor. In addition, the counter 49 is connected to a display panel 51 which reduces the count in the counter 49 by a count of 62 to display the UHF channel number which the system is programmed to calibrate. In other words, if the counter 49 includes a count of 76, the display 51 will show that channel 14 is being calibrated and, at the other extreme of the UHF frequency spectrum, if the counter 49 includes a count of 145, the display 51 will show that channel 83 is being calibrated.

The output of the voltage controlled oscillator 33 of the frequency synthesizer 11 is coupled, as shown by line 53, to the harmonic generator 15. The harmonic generator distorts the sine wave output of the voltage controlled oscillator 33 to produce, in addition to the fundamental frequency of the voltage controlled oscillator 33, a full spectrum of harmonics of that fundamental frequency, including, for example, the second, third, fourth, fifth, sixth, etc. harmonics of the fundamental frequency. Since the frequency synthesizer 11 will not operate satisfactorily at the frequencies required for UHF television measurements, the sixth harmonic of the fundamental frequency is utilized for testing purposes. It was explained earlier that the voltage controlled oscillator 33 may be programmed to produce output signals between 76 and 145 MHz, so that the sixth harmonic produced by the harmonic generator 15 will vary in 6 MHz steps between 456 MHz and 840 MHz.

The sweep generator 21 is substantially identical to the "sweep generator having automatically controlled center frequency" which is described in the above referenced patent to Neil R. Welsh, No. 3,427,535. This sweep generator 21 is designed to produce an output signal which cyclically sweeps through a predetermined frequency range, the center frequency $f_c$ of which is determined by a signal on an input line 55. This input signal is coupled to an autotrack circuit 57 which is designated "automatic tracking stage" in the prior patent, which produces, in turn, an output DC signal which is coupled to a summation circuit 59. A sweep width and center frequency control circuit 61 has an output ramp signal which is connected to the summation circuit 59, and together these signals produce an output signal from the summation circuit 59 on a line 62 which controls the output frequency of a voltage controlled oscillator 63. The sweep generator 21 additionally includes a ramp generator 65 for producing a ramp voltage to control the horizontal input of the oscilloscope 29 and to produce the input voltage for the sweep width and center frequency control 61. The ramp generator additionally includes an output on a line 67 to a blanking circuit 69 which controls power supply 71 to the voltage controlled oscillator 63 so that the voltage controlled oscillator 63 does not operate during retrace of the oscilloscope 29. The sweep width of the voltage controlled oscillator 63 is controlled by the sweep width and center frequency control 61 and a nominal center frequency is likewise controlled by the sweep width and center frequency control 61. The autotrack circuit 67, however, as explained in the previous patent, may override this nominal center frequency. Thus, the time of occurrence of a pulse on the line 55, which for explanatory purposes in the prior patent was a pulse from a marker pulse generator, may control the center frequency of the voltage controlled oscillator 63.

Figures 3A, 3B, 3C, 3D, 3E, 3F, 3G:
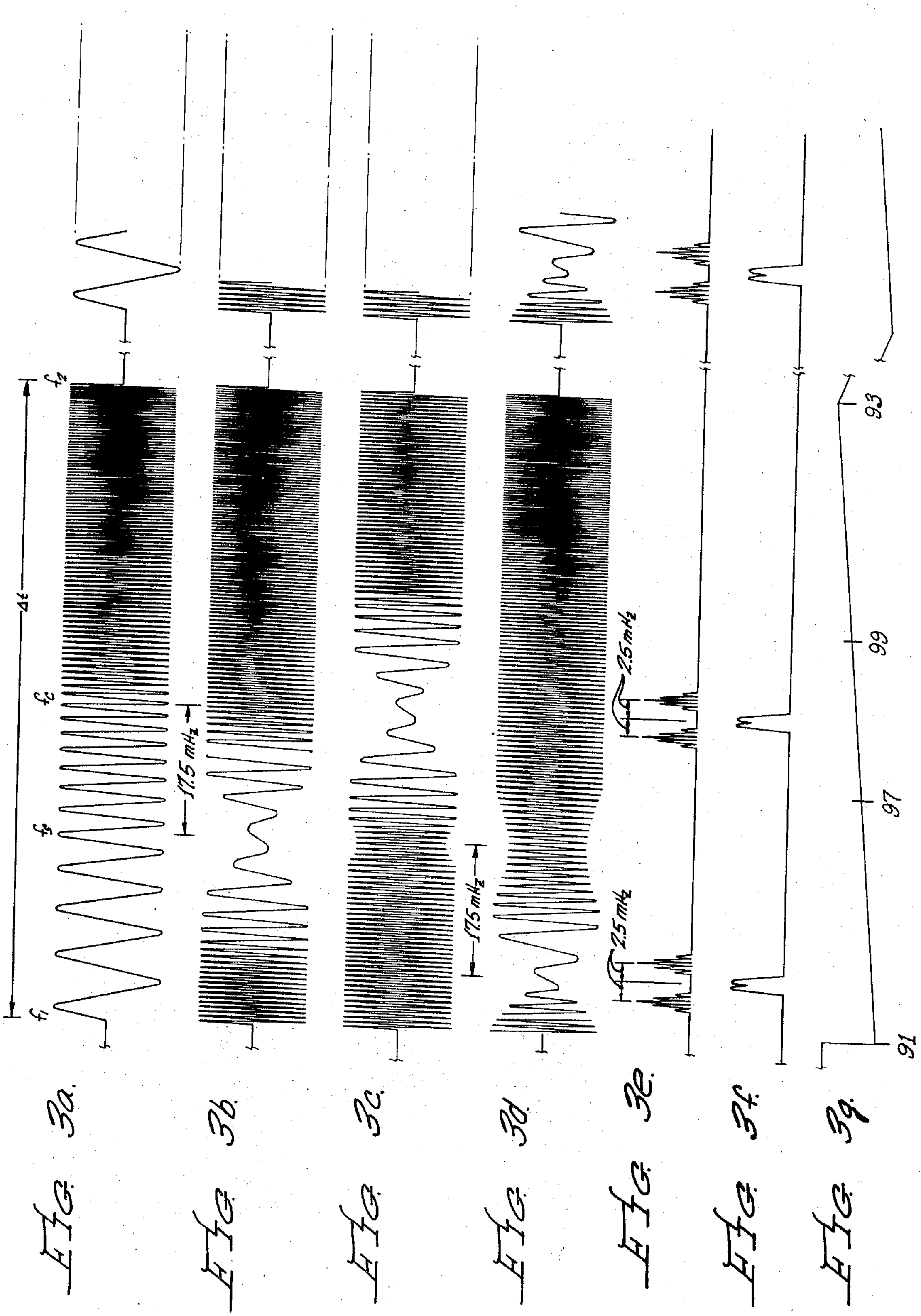

The voltage controlled oscillator 63 has an output which is shown in FIG. 3*a*, wherein $f_1$ is the lowest frequency of the cyclic sweep, $f_2$ is the highest frequency of this sweep, and $f_c$ is the center frequency, the frequency difference $\Delta f$ being the sweep width of the voltage controlled oscillator 63 as controlled by the sweep width and the center frequency control 61. The sweep generator 21 is operated in the marker track mode described in the previous patent so that the center frequency $f_c$ of the voltage controlled oscillator 63 is controlled to occur simultaneously with the presence on the line 55 of a marker pulse. If the center frequency $f_c$ is reached before the occurrence of such a marker pulse, the autotrack circuitry 57 will increase the center frequency $f_c$ until simultaneous occurrence exists. Similarly if the center frequency $f_c$ is produced by the voltage controlled oscillator 63 after the receipt of a pulse on the line 55, the autotrack circuitry 57 will operate to decrease the center frequency of the voltage controlled oscillator 63. In each instance however, the sweep width is maintained constant by the sweep width and the center frequency control 61 so that a different but equal portion of the frequency spectrum is swept by the voltage controlled oscillator 63.

The output of the voltage controlled oscillator 63 is coupled to the device under test 27, in this case a UHF television tuner, so that the operation of the device 27 at each of the frequencies swept by the voltage controlled oscillator 63 may be viewed on the oscilloscope 29.

The output of the voltage controlled oscillator 63 and the output of the harmonic generator 15, that is, the sixth harmonic of the output of the voltage controlled oscillator 33, are heterodyned in a mixer 19. The mixer 19 produces an output signal on line 73 which is shown in FIG. 3*b*. It should be noted that, as previously stated, the output of the frequency synthesizer may be any frequency in MHz increments between 76 and 145 MHz. The sixth harmonic signal produced by the harmonic generator 15 may therefore be any of 69 discrete signals between 456 and 870 MHz. The arithmetic centers of the standard UHF television channels for US broadcasts, however, are at 6 MHz intervals beginning with 473.5 MHz for channel 14 and extending to 887.5 MHz for channel 83. Since it is economically impractical to construct the frequency synthesizer to produce these frequencies, the null point produced by the mixer 19 on the line 73 will occur at $f_s$, 17.5 MHz below the desired channel center frequency $f_c$, as shown in FIG. 3*b*. In order to adjust for this discrepancy, the signal on the line 73 is coupled to a converter 75 in the marker generator 23. A crystal oscillator 77 in the marker generator 23 is used as a local oscillator to produce a signal at 17.5 MHz for heterodyning in the converter 75 with the singal on the line 73. In the absence of the control gating accomplished in the harmonic selector 17, which is explained below, the converter 75 produces sum and difference signals shown in FIGS. 3*c* and 3*d* as a result of the heterodyning of the signal shown in FIG. 3*b* with 17.5 MHz. As can be seen in FIGS. 3*c* and 3*d*, the sum and difference signals produce a frequency null point, respectively, at $f_c$ and at 17.5 MHz below the sixth harmonic of the frequency synthesizer output. These output signals, shown in FIGS. 3*c* and 3*d*, are connected to both a tuned amplifier 79 and a pulse amplifier 81. The tuned amplifier 79 is designed as a bandpass device which will pass only signals at 2.25 MHz. Since each of the signals shown in FIGS. 3*c* and 3*d* will pass through a frequency of 2.25 MHz on each side of the frequency nulls shown, the output of the tuned amplifier 79 will be shown in FIG. 3*e*, that is, a 2.25 MHz signal displaced by 2.25 MHz on each side of the null frequencies shown in FIG. 3*c* and 3*d*. The pair of signals generated from the summation waveform, that is, the waveform of FIG. 3*c*, are displaced from the frequency $f_c$ by 2.25 megacycles which is the proper location of audio and video carrier markers for testing a UHF tuner. The output of the tuned amplifier is connected to a pulse generator 83 to produce pulses at the occurrence of these 2.25 MHz signals, which pulses are combined in the adder 25 with the output of the device under test 27 for display on the vertical input on the oscilloscope 29.

The output of the converter 75, as previously stated, is also connected to a pulse amplifier 81, which amplifier includes a lowpass filter. This pulse amplifier 81 will therefore produce an output signal on line 55 as shown in FIG. 3*f*, that is, a marker signal which is present only when the signals shown in FIGS. 3*c* and 3*d* are below a predetermined frequency. This frequency may be set sufficiently low that the signals of FIG. 3*f* properly mark the null frequency of the signals shown in FIGS. 3*c* and 3*d*. The signal resulting from the summation signal of 3*c* therefore marks the arithmetic channel center, that is, frequency $f_c$, and will be used to drive the autotrack circuitry 57 as previously described.

As was mentioned previously, the harmonic generator 15 produces a large plurality of harmonics of the fundamental frequency of the voltage controlled oscillator 33. Since it is desired to use only the sixth harmonic for UHF testing, a circuit is included which selectively permits operation of the harmonic generator 15 only when the voltage controlled oscillator 63 is in the frequency vicinity of this sixth harmonic. By so limiting the harmonic generator 15, the mixer 19 can be controlled to produce an output signal only when the voltage controlled oscillator 63 is at approximately the correct frequency. Furthermore, a review of the waveforms of FIGS. 3*c* through 3*f* makes it apparent that the marker pulses shown in FIG. 3*e* include, in addition to the marker pulses displaced 2.25 MHz above and below the frequency $f_c$ which are the desired markers, an additional pair of markers which are displaced about a point which is 35 MHz below the desired frequency markers. This duplication of markers is likewise evident in FIG. 3*f*. By properly controlling the harmonic generator so that it is not allowed to produce an output signal until the voltage controlled oscillator 63 is above the frequencies represented by the first two markers in FIG. 3*e* and the first marker in FIG. 3*f*, it is possible to totally eliminate the production of these markers so that only the desired markers are produced and utilized to drive the autotrack circuit 57 and the vertical input of the oscilloscope 29.

In the preferred embodiment this limitation on the operation of the harmonic generator 14 is accomplished by the harmonic selector 17. This harmonic selector 17 includes a frequency to voltage converter 85 which is coupled to the output of the prescaler 37 of the frequency synthesizer 11 and therefore receives, as one input, a signal having a frequency which is a predetermined submultiple of the frequency of the voltage controlled oscillator 33, namely 1/32 of that frequency. In addition, the frequency to voltage converter 85 receives the output of the 1 MHz reference oscillator 31. The frequency to voltage converter 85 permits one 1.0 microsecond pulse from the reference oscillator 31 to pass to an integrating amplifier on the receipt of each cycle from the prescaler 37. The integrating amplifier then produces an output DC level which is proportional to the output frequency from the prescaler 37. This output DC signal is conducted through line 87 to a comparator 89 which receives as a second input signal the output of the summation circuit 59 of the sweep generator 21, that is, the ramp signal which is used to drive the voltage controlled oscillator 63 of the sweep generator 21. This ramp signal from the summation circuit 59 is shown in FIG. *3g*,and varies between a first negative voltage, shown as point 91, and a second negative voltage, shown as point 93, to drive the voltage controlled oscillator 63 between the lowest frequency of interest and the highest frequency of interest, respectively. By way of example, the voltage of the waveform shown in FIG. *3g* at point 91 may be −10 volts and the voltage shown at the point 93 may be 0 volts. For the purpose of this example, the output of the frequency to voltage converter 85 might be, for example, −10 volts. The comparator 89 selects a predetermined ratio of this output DC voltage from the frequency to voltage converter for producing a first output signal and a second predetermined ratio for producing a second output signal. These output signals are used, respectively, to open and close a gate 95 of the harmonic selector 17, which in turn permits and prohibits operation of the harmonic generator 15. Thus, when the output signal from the summation circuit 59 reaches a DC level which is a first predetermined ratio of the output of the frequency to voltage converter 85, the harmonic generator 15 will be energized. When the output of the summation circuit reaches a DC level which is equivalent to the second predetermined ratio of the output of the frequency to voltage converter 85, the harmonic generator 15 is disabled. Thus, for purposes of the specific example and referring to FIG. *3g*, if the output of the summation circuit 59 varies as a ramp function between −10 volts and 0 volts during the sweep of the voltage controlled oscillator 63, and if the first and second ratios are 0.6 and 0.5, respectively, of the 10 volt exemplary output of the frequency to voltage converter 85, the harmonic generator will be enabled when the signal *3g* reaches −6 volts at point 97 and will be disabled when the signal *3g* reaches −5 volts, as shown at point 99. If the specific ratios, that is 0.5 and 0.6 in the example given, are properly selected, it is possible to permit only the sixth harmonic of the voltage controlled oscillator 33 to be connected to the mixer 19. Similarly this selection will only permit the generation of the latter two pulses of FIG. *3e* and the final pulse shown in FIG. *3f*.

The frequency to voltage converter 85 and the comparator 89 may be even better understood by reference to FIG. 4 which shows a detailed schematic diagram of these subassemblies. The frequency to voltage converter 85 is shown as having a first input connection 99 from the reference oscillator 31 (shown in FIG. 2) and a second input connection 101 from the output of the prescaler 37 (shown in FIG. 2). The input 101 is initially prescaled in the frequency to voltage prescaler 103 by a factor of 12. Since, therefore, the output of the prescaler 103 is factored by 32 in the prescaler 37 and a factor of 12 in the prescaler 103, this output is scaled by a total factor of 384, so that the output of the frequency to voltage prescaler 103 may vary between a low frequency of 197,917 Hz and a high frequency of 377,604 Hz in discrete steps of 2,604 Hz as the voltage controlled oscillator 33 of the frequency synthesizer 11 is stepped in 1 MHz steps between 76 and 145 MHz. This additional prescaling in the element 103 is necessary, since the frequency to voltage converter will operate satisfactorily only if the output of the prescaler 103 is at a frequency which is less than one-half the input frequency on line 99 from the reference oscillator 31.

It will be recalled that the input 99 is a 1 MHz square wave. The output of the frequency to voltage prescaler 103 and the reference oscillator 31 are coupled to a dual JK flip flop 104 which, for example, may be an integrated circuit manufactured by Texas Instruments under the part No. SN7473N. This integrated circuit, when connected in the manner shown in FIG. 4, will produce an output on line 105 which includes one pulse from the reference oscillator 31 upon each occurrence of a trailing edge of the square wave received from the prescaler 103. Referring to FIG. *5a*, the 1 megacycle square wave produced by the reference oscillator 31 is shown, and it will be noted that the operation of section B of the dual JK flip flop 104 occurs on the trailing edges of the 1 megacylce wave so that the output pulses from the dual JK flip flop 104 will be 1 microsecond in duration. Section B of the dual JK flip flop will therefore produce a 1 microsecond output pulse upon each occurrence of a trailing edge of the square wave received from the prescaler 103. FIG. *5b* shows an example of the output of the frequency to voltage prescaler 103 when the voltage controlled oscillator 33 is operating at 76 MHz so that the output of the prescaler 103 is at 197,917 Hz. FIG. *5c* shows the output on line 105 of the dual JK flip flop 104 in response to the input signals shown in FIGS. *5a* and *5b*. It will be noted that the dual JK flip flop 104 produces, as an output, a single 1 microsecond pulse following each trailing edge of the square wave signal of FIG. *5b*, so that, when the frequency of the signal from the frequency to voltage prescaler 103 is one-fifth the one megacycle frequency of the voltage controlled oscillator 33, the duty cycle of the output signal shown in FIG. *5c* will be one-fifth. FIG. *5d* shows an exemplary output of the frequency to voltage prescaler 103 when the voltage controlled oscillator 33 is operating at 145 MHz, so that the output of the prescaler 103 is at 377,604 Hz. In this instance, the output of the dual JK flip flop 104 on line 105, as shown in FIG. *5e* is a 1 microsecond pulse following each trailing edge of the signal shown in FIG. *5d* and therefore has a duty cycle of approximately two-fifths. The output of the dual JK flip flop is coupled through a base resistor 107 which is selected to properly adjust the input current level at the transistor pulse amplifier 109. This pulse amplifier is supplied with positive potential from a nominal +5V bus 111 through the usual biasing resistor 113 and the resistor 107 is shunted with a capacitor 115 to stabilize the leading edge of the pulses arriving on line 109 so that a constant 1 microsecond pulse may be produced even as the temperature of this transistor amplifier 109 changes. The output of the pulse amplifier 109 is coupled to a load resistor 117 and, is addition, is coupled to an integrating filter which includes a series resistor 119 and a shunt capacitor 121. This filter produces a DC level which is proportional to the duty cycle of the dual JK flip flop 104, so that this DC level is in turn proportional to the frequency of the voltage controlled oscillator 33. This DC level is coupled through an input resistor 123 which is used for balancing the inputs of an operational amplifier 125. This operational amplifier 125 may be, for example, a unit manufactured by Fairchild Electronics under the part No. UA 748. A feedback integrating capacitor 127 is used to further assure a smooth DC level at the output 129 of the operational amplifier 125. The remaining input 131 of the operational amplifier 125 is coupled to a feedback resistor 131 and, through a resistor 135 and a variable resistor 137, to the junction of a pair of biasing resistors 139 and 141. Since the gain of the operational amplifier 125 is equal to the following ratio:

$$\frac{R\,133}{R\,135+R\,137+\left(\frac{(R\,139)\;(R\,141)}{R\,139+R\,141}\right)}$$

the resistor 137 may be varied to adjust the gain of the operational amplifier 125 to produce the proper output DC voltage in response to the varying frequency from the voltage controlled oscillator 33. In the preferred embodiment, the output 129 of the operational amplifier 125 varies from 0 volts to +20 volts as the voltage controlled oscillator 33 changes from 76 to 145 MHz. The output of the operational amplifier 125 is coupled to a voltage divider network comprising resistors 143, 145 and 147 and a variable resistor 149, each of which is series connected between the output 129 and a minus potential, which in the preferred embodiment is –24 volts at point 151. It will be understood, therefore, that as the voltage controlled oscillator 33 is stepped in 1 MHz increments from 76 to 145 MHz, the junction point 153 between the resistors 143 and 145 will step in increments between –12 and –3 volts. Similarly, the junction point 155 between the resistors 145 and 147 will step in increments between –13 volts and –4 volts. In each instance the voltage at the junction 155 will be slightly more negative than the voltage at the junction 153. Each of the junction points 153 and 155, as well as the output of the summation circuit 59 which is connected to the input terminal 157, is connected as an input to the comparator 89. In the preferred embodiment, this comparator circuit 89 includes a first differential amplifier 159, a second differential amplifier 161 and a NOR gate 163. The comparator circuit 89 is comprised of five transistor array 164 which may be purchased, for example, under part No. CA3146E from RCA Electronics Corporation. Standard load resistors 171 and 172 are used, resistors 173 and 174 are used to set the current levels of the differential amplifiers 159 and 161. The NOR gate has a typical load resistor 175, gating diodes 176 and 177, and a resistor 178 used to prevent the NOR gate 163 from being enabled by leakage currents. The differential amplifier 159 functions such that, if the input from the junction 155 is more positive than the input from terminal 157, the output at point 165 will be positive. If, on the other hand, the input from the terminal 157 is more positive than the input from the junction 155, the output at point 165 will be ground or negative. Similarly, the differential amplifier 161 functions such that, if the input from the junction 153 is more positive than the input from the input terminal 157, the output at point 167 will be ground or negative. If, on the other hand, the input from the junction 153 is more negative than the input from the input terminal 157, the output at point 167 will be positive. The NOR gate 163 will operate to produce an output on line 169 which is connected to the gate 95 (FIG. 2). This output is positive only when each of the points 165 and 167 are at ground or negative potential. Referring once again to FIG. 3*g*, it will be appreciated that the input signal on line 157 is a ramp voltage. Since the potential at point 155 is always slightly lower than the potential at point 153, the comparator circuit 89 will produce a positive output on line 169 to enable the gate 95 of FIG. 2 only when the potential of the ramp function shown in FIG. 3*g* is in the narrow voltage range between the potentials of junctions 153 and 155. This narrow voltage range may be selected by adjusting the variable resistor 149 to permit only the latter two pulses of FIG. 3*e* and the latter pulse of FIG. 3*f* to be produced by the harmonic generator 15 of FIG. 2, both of which are derived from the sixth harmonic from the harmonic generator 15.

It will be readily understood that the frequency to voltage converter 85 and the comparator 89 may be adjusted, for example, by changing the values of the resistors 143, 145, 147 and 149 in the comparator 89 in order to select any harmonic which is desired other than the six harmonic. Thus, for example, if the present invention is to be used in the VHF frequency range, where the range of frequencies is much broader than the one octave which occurs in the UHF spectrum, it may be desirable to select different harmonics from the harmonic generator 15 for use in monitoring different VHF channels. This may be conveniently accomplished by changing the voltage levels within the comparator 89 to permit different portions of the output of the harmonic generator 15 to be displayed.

What is claimed is:

1. A sweep generator, comprising:

variable oscillator means for supplying an output signal which continously varies in frequency through a frequency range;

a crystal oscillator for providing a stable, fixed frequency output signal;

a frequency synthesizer, comprising:

a controlled oscillator for producing an adjustable frequency output in response to an input signal;

means for reducing said adjustable frequency output by a predetermined factor to produce a scaled output; and means for comparing said scaled output with said fixed frequency output to produce said input signal;

means for operatively coupling said frequency synthesizer to said variable oscillator means to produce marker signals referenced to said crystal oscillator, said means for operatively coupling comprising:

a mixer for heterodyning said adjustable frequency output and the output of said variable oscillator means to produce a heterodyne signal;

a second crystal oscillator for providing a second stable fixed frequency output signal;

a second mixer for heterodyning said heterodyne signal with said second fixed frequency output signal for producing a second heterodyne signal having a frequency null point; and a bandpass filter for filtering said second heterodyne signal to produce a pair of marker signals.

2. A sweep generator as defined in claim 1 wherein said bandpass filter is tuned to produce a pair of marker signals equally spaced above and below said frequency null point.

3. A sweep generator, comprising:

variable oscillator means for supplying an output signal which continuously varies in frequency through a frequency range;

a crystal oscillator for providing a stable, fixed frequency output signal;

a frequency synthesizer, comprising:

a controlled oscillator for producing an adjustable frequency output in response to an input signal;
means for reducing said adjustable frequency output by a predetermined factor to produce a scaled output; and
means for comparing said scaled output with said fixed frequency output to produce said input signal;
means for operatively coupling said frequency synthesizer to said variable oscillator means to produce marker signals referenced to said crystal oscillator, said means for operatively coupling comprising:
a mixer for heterodyning said adjustable frequency output and the output of said variable oscillator means to produce a heterodyne signal;
a filter for filtering said heterodyne signal to produce a marker signal; and
means for controlling the center frequency of said continuously varying frequency signal of said variable oscillator in response to said marker signals without varying said frequency range.

4. A sweep generator as defined in claim 3 wherein said means for reducing said adjustable frequency comprises a variable divide-by-N digital divider circuit.

5. A sweep generator as defined in claim 4 wherein said means for reducing said adjustable frequency additionally comprises means for adjusting the reduction factor of said divide-by-N digital divider circuit in response to a digital signal input.

6. A sweep generator for cyclically producing a variable frequency output signal, said sweep generator including a marker system comprising:
an oxcillator for producing a first frequency signal;
a harmonic generator responsive to said first frequency signal for producing a plurality of harmonic signals from said first frequency signal;
means for selecting one of said plurality of harmonic signals; and
means for producing a marker signal only in response to said selected one of said plurality of harmonic signals, comprising:
means for heterodyning the output of said means for selecting one of said plurality of harmonic signals with said variable frequency output signal; and
a filter coupled to said means for heterodyning for producing said marker signal.

7. A sweep generator as defined in claim 6 wherein said filter comprises a bandpass filter coupled to said means for heterodyning for producing a pair of marker signals.

8. A sweep generator as defined in claim 6, said sweep generator producing a ramp signal, wherein said means for selecting comprises:
means for generating an analog signal having an amplitude proportional to the frequency of said first frequency signal;
means for comparing the amplitude of said analog signal with the amplitude of said ramp signal to produce a gating signal; and
means for enabling said harmonic generator in response to said gating signal.

9. A sweep generator as defined in claim 6 wherein said oscillator is crystal controlled, so that said marker signal is crystal referenced.

10. A sweep generator as defined in claim 6 additionally comprising means for centering said variable frequency output signal in response to said marker signal.

11. A sweep generator as defined in claim 6 wherein said oscillator comprises:
a frequency signal source for producing a first oscillation signal; and
a frequency synthesizer responsive to said first oscillation signal for producing a second oscillation signal which is a predetermined multiple of said first oscillation signal, said second oscillation signal being said first frequency signal.

12. A sweep generator, comprising:
variable oscillator means for supplying an output signal which continuously varies in frequency through a frequency range centered at a center frequency;
a crystal oscillator for providing a stable, fixed frequency output signal;
a frequency synthesizer, comprising:
a voltage controlled oscillator for producing an adjustable frequency output in response to an input voltage signal;
means for reducing said adjustable frequency output by a predetermined factor to produce a scaled output; and
means for comparing said scaled output with said fixed frequency output to produce said input voltage signal;
means responsive to the output of said frequency synthesizer for automatically controlling said center frequency of said variable oscillator means without changing said frequency range, comprising:
a mixer for heterodyning said adjustable frequency output with said variable oscillator output signal to produce a heterodyne signal; and
a filter coupled to receive said heterodyne signal for producing an output signal for automatically controlling said center frequency of said variable oscillator means.

13. A sweep generator as defined in claim 12 additionally comprising:
a second crystal oscillator for providing a second stable fixed frequency output signal; and
means for mixing said heterodyne signal with said second stable fixed frequency output signal to produce a second heterodyne signal.

14. A sweep generator as defined in claim 12 wherein said means for reducing said adjustable frequency output comprises a variable divide-by-N digital divider circuit.

15. A sweep generator as defined in claim 14 wherein said means for reducing said adjustable frequency output additionally comprises means for adjusting the reduction factor of said variable divide-by-N digital dividing circuit.

16. A marker generator for producing crystal controlled marker pulses in a sweep generator system, said sweep generator system producing a ramp signal and a cyclicly varying frequency signal proportional in frequency to the amplitude of said ramp signal, comprising:
a crystal controlled oscillator for producing a first frequency output signal;
a frequency synthesizer responsive to said first frequency output signal for producing a second frequency output signal which is a predetermined multiple of said first frequency output signal;
means for comparing said first frequency output signal with said second frequency output signal to generate an analog signal indicative of said second frequency;

a harmonic generator connected to said second frequency output signal for producing harmonic signals;

gate means responsive to said ramp signal and said analog signal for selectively enabling said harmonic generator in response to a predetermined relationship of said ramp signal to said analog signal;

means for heterodyning said harmonic signals with said cyclicly varying frequency signal; and means for filtering the output of said means for heterodyning to produce a marker signal.

17. A marker generator as defined in claim 16 additionally comprising:

means for adjusting said means for comparing to produce an analog signal which permits said gate means to enable said harmonic generator only when said cyclicly varying frequency signal has a predetermined frequency relationship with a predetermined harmonic of said second frequency output signal.

18. A sweep generator having a sweep width and a center frequency $f_c$ which automatically varies in accordance with the time of occurrence of a marker pulse, comprising:

a crystal controlled frequency synthesizer for producing a first frequency signal;

means for heterodyning said first frequency signal with the output of said sweep generator to produce a first heterodyne signal;

an oscillator for producing a second frequency signal;

means for heterodyning said first heterodyne signal with said second frequency signal to produce a second heterodyne signal;

means for producing said marker pulse, said means comprising:

a filter responsive to said second heterodyne signal for producing a filtered output; and a pulse generator responsive to said filtered output; and means responsive to said marker pulse for controlling said center frequency $f_c$ independent of said sweep width.

19. A sweep generator as defined in claim 18 wherein said crystal controlled frequency synthesizer comprises:

means for generating a fixed frequency signal;

means for generating harmonics of said fixed frequency signal; and means for selecting only one of said harmonics of said fixed frequency signal, said selected signal being said first frequency signal.

20. A sweep generator as defined in claim 18 wherein said oscillator for producing a second frequency signal is a crystal controlled oscillator.

21. A digitally controlled oscillator, comprising:

a cyclic frequency generator for repetitively producing an output signal which sweeps through frequencies between a predetermined minimum and maximum frequency, said frequency generator additionally producing a ramp signal having an instantaneous amplitude which is proportional to the instantaneous frequency of said output signal;

a frequency signal source;

means for selectively enabling said frequency source in response to the instantaneous amplitude of said ramp signal; and means for heterodyning the output of said frequency signal source with said output signal.

22. A digitally controlled oscillator as defined in claim 21 wherein said frequency signal source comprises:

an oscillator for producing a first frequency output signal; and a frequency synthesizer responsive to said first frequency output signal for producing a second frequency output signal which is a predetermined multiple of said first frequency output signal, said second frequency output signal being the output of said frequency signal source.

23. A digitally controlled oscillator as defined in claim 22 wherein said frequency signal source additionally comprises:

a harmonic generator connected to said second frequency output signal for producing harmonic signals.

* * * * *